UNITED STATES PATENT OFFICE.

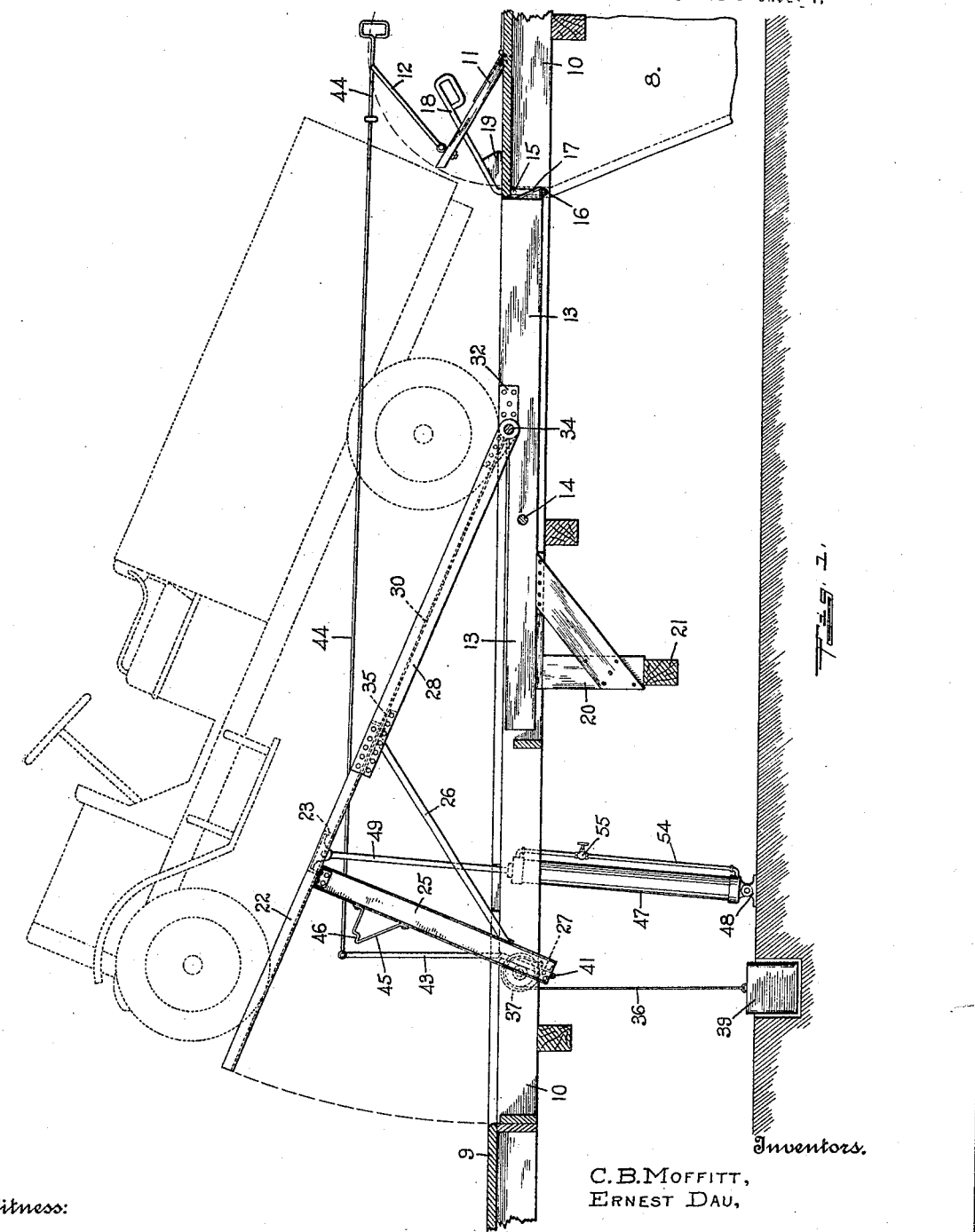

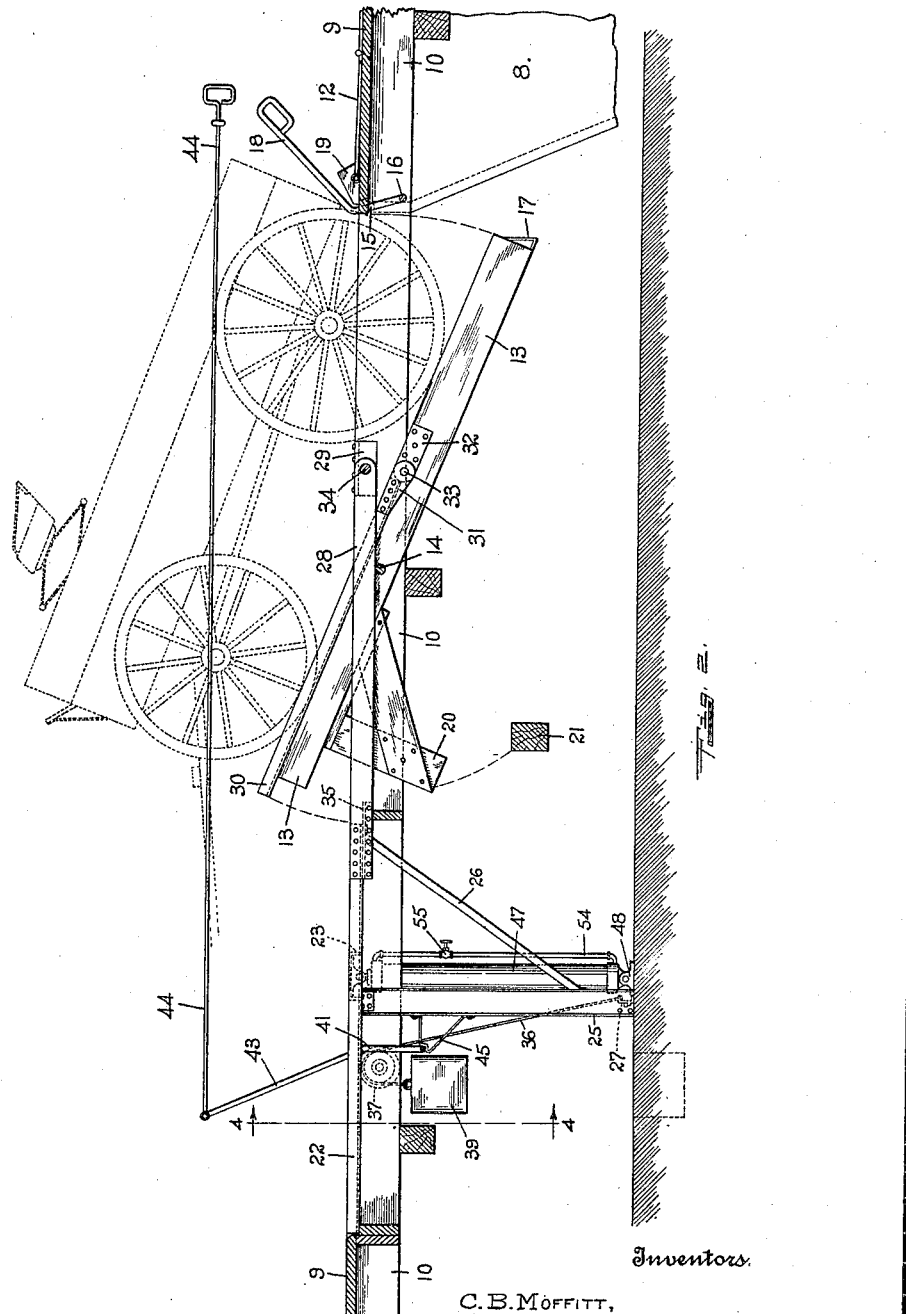

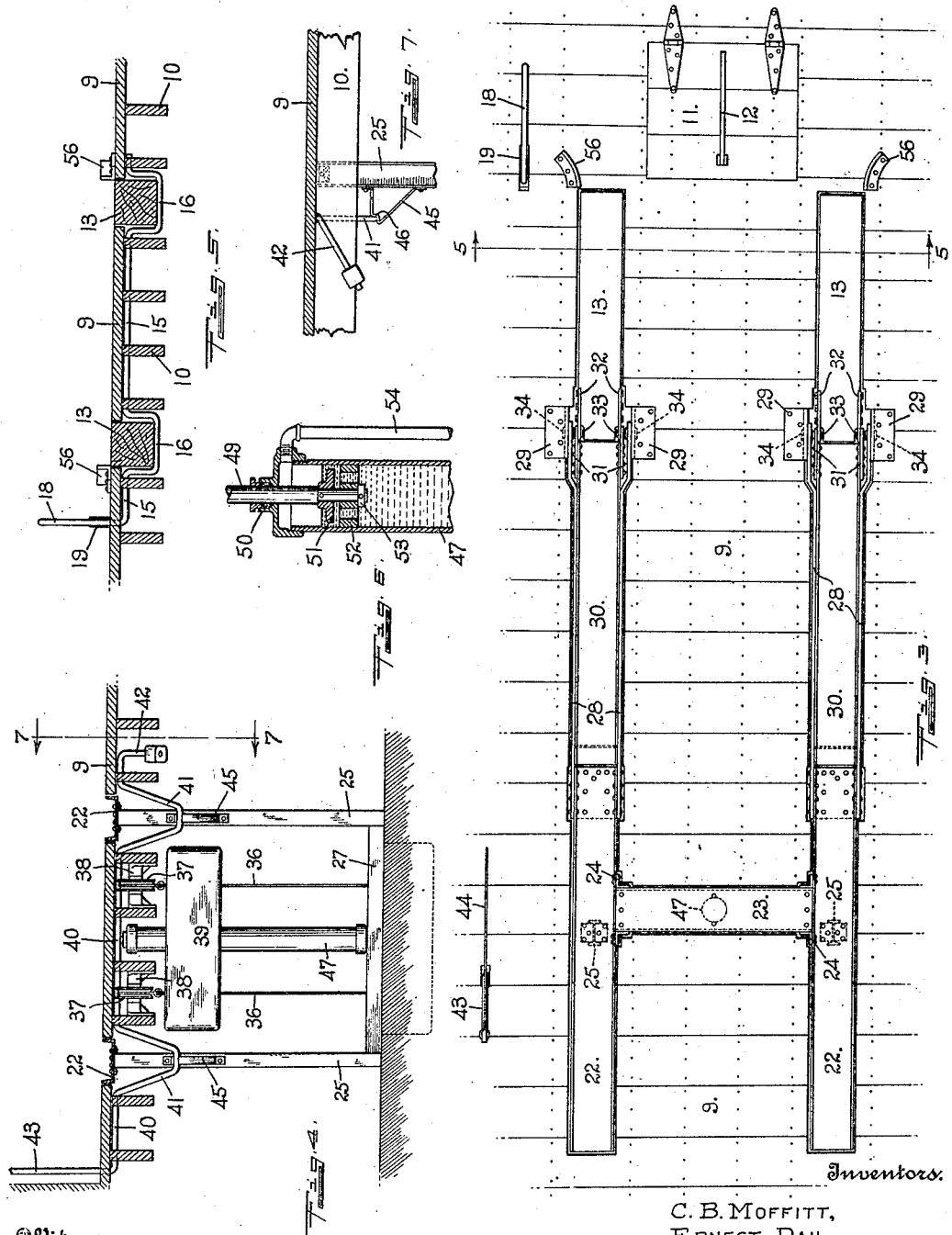

CLYDE B. MOFFITT, OF OMAHA, AND ERNEST DAU, OF SCRIBNER, NEBRASKA; SAID DAU ASSIGNOR TO SAID MOFFITT.

MOTOR-TRUCK DUMP.

1,403,050.        Specification of Letters Patent.        Patented Jan. 10, 1922.

Application filed May 17, 1919. Serial No. 297,956.

*To all whom it may concern:*

Be it known that we, CLYDE B. MOFFITT and ERNEST DAU, citizens of the United States, and residents, respectively, of Omaha, in the county of Douglas and State of Nebraska, and of Scribner, in the county of Dodge and State of Nebraska, have invented certain new and useful Improvements in Motor-Truck Dumps, of which the following is a specification.

Our invention relates to mechanism or apparatus for unloading vehicles which are not provided in themselves with dumping or unloading devices. It is the object of our invention to provide a mechanism adapted for dumping the loads carried by motor-trucks, for use in grain elevators, mills, and the like, where it is desirable that the materials carried by the vehicles be discharged at a fixed point. A further object of our invention is to provide mechanism of this class wherein the movement of the truck to dumping position is effected by its own power, so that no other power is needed for actuating the dump mechanism. A further object of our invention is to provide a dumping mechanism of the class indicated, which may be installed without interference with the ordinary wagon-dump mechanism now commonly provided in grain elevators and mills for use with horse-drawn vehicles. A further object of our invention is to provide suitable controlling means for the dumping mechanism, whereby the operation thereof may be effected with minimum effort by an attendant stationed so as to have essential portions of the apparatus under observation. Further and more particular objects of our invention will appear hereinafter.

In the accompanying drawings Fig. 1 is a longitudinal vertical sectional view of apparatus embodying our invention, in dumping position for a motor-truck, Fig. 2 is a similar view, showing the associated wagon-dump in operative position, Fig. 3 is a plan view of the mechanism, Fig. 4 is a transverse vertical section on the line 4—4 of Fig. 2, Fig. 5 is a transverse vertical section on the line 5—5 of Fig. 3, Fig. 6 is a detail vertical section of a portion of the buffer-cylinder, and Fig. 7 is a detail vertical section on the line 7—7 of Fig. 4, affording a side view of portions of the locking mechanism for holding the inclinable frame in horizontal position.

In carrying out our invention according to the illustrated embodiment thereof, the truck dumping mechanism is associated with an ordinary wagon-dump, so that the load of a truck will be discharged into the same chute or hopper as that employed for the wagon-dump. In the usual arrangement of the wagon-dump mechanism in elevators and mills the hopper or chute 8, into which the material is discharged from the vehicles, is disposed beneath a driveway which extends through or alongside the elevator or mill building at a height such that the dumped material may descend by gravity to the pit or elevator boot. In the construction shown, the floor 9 of the driveway is formed by planks laid transversely upon supporting joists 10 which extend longitudinally of the driveway. The mouth or opening of the hopper 8 is provided at the level of the floor 9 with a hinged trap-door 11 openable upwardly by means of a lifting-handle 12 pivoted thereto, said handle being employed as a prop to support the door in an inclined position when open. The dump-logs 13 are arranged in longitudinally extending openings in the floor 9, the rear ends thereof being in proximity to the front side of the hopper-opening, and the upper sides of the dump-logs being normally flush with the floor. The dump-logs are pivoted on a transverse shaft 14 which extends through the same and the floor-joists at a point in front of the centers of the logs, whereby the same have a tendency to swing down at their rear ends. Said rear ends of the dump-logs are normally supported by means of a shaft 15 mounted pivotally in notches formed in the joists 10, said shaft having U-shaped crank-portions 16 which pass beneath latch-plates 17 at the ends of the logs, and the shaft having at one end a handle 18 which extends up through the floor 9 and normally rests against a stop-block 19, as shown in Fig. 1. The front portions of the dump-logs are provided with legs 20 which rest on a cross-beam 21 when the logs are in normal horizontal position. The dump-logs are released, to permit dropping thereof to the dumping position shown in Fig. 2, by raising the handle 18 to swing the cranks 16 rearwardly and disengage them from the latch-plates 17. The dump-logs are so arranged and proportioned that when an ordinary horse-drawn wagon is moved into a position at which the rear end of the wagon is above the pit-door 11 all of the wheels of the wagon will rest upon the dump-logs, and the weight thereon will be so distributed that the rear end will drop down when the supporting-cranks 16 are moved to release position. The wagon is thus lowered at the rear end and raised at the front end, assuming an inclined position at which the grain will flow from the wagon-body into the pit. After the dumping of the load from the wagon, the latter is drawn forward, and as the weight thereof comes onto the front portions of the dump-logs the latter are depressed and the rear ends thereof raised to the normal horizontal position at which they are engaged and supported by the cranks 16. It will be understood that the foregoing structure comprises merely the usual wagon-dump mechanism commonly found in elevators and mills, and that the same is here illustrated and described for the purpose of clearly showing the cooperative relation of our truck dump mechanism therewith.

The truck dumping mechanism comprises essentially an inclinable track or wheel-supporting frame which lies normally at the level of the driveway floor 9, and which may be raised to a position at which it slopes upwardly from said floor, whereby a loaded motor-truck may be driven thereon under its own power to a position at which the front wheels are elevated upon the inclined track, while the rear wheels remain at the level of the floor, thus throwing the body of the truck to an inclined position at which its load may be discharged into the dump-hopper by merely opening the end-gate of the truck-body and permitting the material to flow therefrom into the hopper. In the illustrated and preferred structure the inclinable frame has at the front portion thereof a pair of metal channel-beams 22 which lie in longitudinal alinement with the logs 13 of the wagon-dump and extend forwardly therefrom, resting normally in slots formed by cutting away portions of the floor 9, so that the upwardly extending flanges at the sides of the channels are flush with the surface of the floor. Between the intermediate portions of the channels 22 there is disposed a metal cross-beam 23, which may be of the same section as the channels, but preferably has the flanges extending downwardly. A transverse portion of the flooring is removed to provide a space for the cross-beam, and the ends of the latter are rigidly secured to the adjacent sides of the channels 22 by suitable connecting members such as the angle-plates 24 shown in Fig. 3. To the lower side of each of the channels 22, adjacent to the ends of the cross-beam, legs 25 are fixedly secured, each of the legs having a brace-bar 26 secured thereto near its lower end and extending upwardly and rearwardly to connect with the respective channel 22 near the rear end thereof. A lower cross-beam 27 extends between the lower ends of the legs and rigidly connects the same to each other. To the sides of each of the channels 22 at the rear end thereof are fixedly connected a pair of bars 28, which are disposed vertically edgewise and which extend back alongside the forward portions of the dump-logs 13, straddling the same so that the dump-logs may swing up between the bars when the latter are in horizontal position. The rear ends of the bars 28 are pivotally connected with angle-plates 29 secured to the floor 9 at the sides of the dump-logs, as best shown in Fig. 3. On each of the dump-logs 13, between the pair of bars 28, there is disposed a channel-beam 30 of the same sectional form as the channels 22, the front ends of the channels 30 adjoining the rear ends of the channels 22 when the parts are in the normal horizontal positions, and the logs 13 being cut away at their upper front portions for a depth equal to that of the channels 30, so that the latter may lie flush with the floor similarly to the channels 22. To the sides of the channels 30 at the rear ends thereof hinge-plates 31 are secured thereto, and said plates are pivotally connected with similar plates 32 which are secured to the dump-logs 13. The parts are so arranged that, when in normal horizontal position, the axes of the pivot-pins 33 connecting the plates 31 and 32 are alined with the pivot-pins 34 which connect the bars 28 and angle-plates 29. The front ends of the channels 30 extend slightly beyond the front ends of the dump-logs 13, so as to overlap and rest upon cross-plates 35 which are secured between the bars 28 and beneath the rear ends of the channels 22.

By the described arrangement of parts, when the wagon-dump is operated as before mentioned, the channels 30 swing up with the dump-logs, resting thereon and operating substantially as a part thereof, as will be apparent from Fig. 2. When the dump-logs 13 are held in their normal horizontal position, however, and the frame formed by the members 22, 23, 24, 25, 26, 27, 28 and 35 is swung up to the inclined position shown in Fig. 1, the channels 30 are moved up therewith, their front ends being supported upon the cross-plates 35 so as to form inclined tracks continuous with those formed by the channels 22. Obviously, when the inclinable frame is raised to the position above mentioned, a motor-truck may be driven thereon until, by elevation of the front portion of the vehicle, the body thereof assumes the position indicated in Fig. 1, which is suitable for discharging the load thereof into the hopper or chute 8. It will be understood, of course, that the parts are suitably proportioned so that the rear end of the truck-body when in dumping position will be in substantially the same relation to the hopper as the rear end of a wagon-body when the latter is dumped by tilting of the logs 13.

Means are provided for controlling the truck-dumping mechanism, as follows: To the cross-beam 27 which extends between the lower ends of the legs 25 there are attached cables 36 or like flexible members which extend upwardly therefrom and pass over sheaves or pulleys 37 revolubly mounted between suitable journal-boxes 38 carried upon the floor-joists 10 intermediate the channels 22, as best shown in Fig. 4. From said sheaves the cables extend down to a counterweight 39 which is of such size as to be capable of raising the frame to the inclined position shown in Fig. 1, when the frame carries no weight other than its own. In other words, the inclinable frame is biased to the raised or elevated position, and assumes such position automatically when it is not prevented from so doing. The counterweight is so proportioned, however, that any considerable additional weight upon the frame, as when a truck has been run into dumping position as above described, will be sufficient to move the frame down to horizontal position. For sustaining the frame in the raised position when a load is carried thereon, a shaft 40 is provided having cranks 41 adjacent to the legs 25, said shaft being pivotally mounted in notches formed in the upper edges of the floor-joists 10, and having at one end a weighted arm 42 (shown in Figs. 4 and 7) which tends to swing the cranks 41 toward the legs. Thus, when the frame is in the raised position the cranks 41 swing in beneath the lower ends of the legs, as shown in Fig. 1, and effectively sustain the additional weight when a truck is run onto the inclined frame. The cross-beam 27 forms a stop to prevent the cranks 41 swinging back too far beneath the legs, and said cross-beam by engaging the lower edges of the floor-joists also forms a stop to limit upward movement of the frame. The shaft 40 has at one end an arm 43 which extends up through the floor, and to the upper end of said arm there is connected an operating-rod 44 which extends back horizontally to a position near the dump-hopper and the handle 18 which controls the wagon-dump. Near the upper ends of the legs 25, at the front sides thereof, brackets 45 are secured thereto as shown, said brackets each having at the front portion thereof an offset or shoulder forming a seat 46 for the respectively adjacent crank 41 of the control-shaft 40. When the frame is moved down to the horizontal position thereof, the inclined lower edges of the brackets 45 engage the cranks and swing the same forwardly until the downward movement of the frame is completed, and the cranks then swing into the seats 46 and retain the frame in the lowered position until the shaft is moved by means of the operating-rod 44 to disengage the cranks from said seats.

For controlling movement of the inclinable frame intermediate the extreme positions thereof, and particularly for preventing too rapid downward movement thereof when loaded, we provide a buffer-cylinder 47 which is arranged beneath the cross-beam 23 and is pivotally connected at its lower end with a suitable supporting base 48. A piston-rod 49 is pivotally connected with the cross-beam 23 and extends slidably through a packing-gland 50 in the cylinder-head, as shown in Fig. 6. Near the lower end of the piston-rod a valve-plate 51 is secured thereto, and upon a reduced portion of the rod below the valve plate a perforate piston 52 is disposed slidably, relative movement of the piston and rod being limited by the valve-plate and a collar 53 secured upon the lower end of the rod. The piston fits slidably within the cylinder, and the perforations in the piston are closed by the valve-plate when the piston is pressed up against the plate. The upper and lower ends of the cylinder are connected by a return-pipe 54 provided intermediate its ends with a valve 55 which may be adjusted to limit flow through the pipe of a liquid such as oil with which the cylinder is filled. It will be seen that during upward movement of the piston-rod the liquid may pass freely around the edges of the valve-plate and through the perforations of the piston, thus offering but slight resistance to the movement; while upon downward movement of the piston-rod the valve-plate will first engage the piston to stop off the openings therein, and thereafter the liquid will be forced to pass from the lower to the upper portion of the cylinder through the return-pipe 54, thus yieldingly resisting the movement to an extent determined by the adjustment of the valve 55.

From the foregoing it will be apparent that the operation of the mechanism may be substantially automatic. The track-frame being in the horizontal position, and it being desired to discharge the load of a motor-truck, the operator or attendant merely pulls upon the rod 44 to disengage the cranks 41 from the seats 46, and the frame is moved up to the inclined position by the counterweight, the frame being locked in the raised position by the cranks 41 dropping in beneath the lower ends of the legs 25. The driver of the truck then runs the same into dumping position upon the frame, which may be readily effected since only the front wheels of the vehicle need be elevated from the level of the driveway floor, and only a small proportion of the weight of the vehicle is carried upon the front wheels. To insure a proper guiding of the vehicle onto the tracks angle-plates 56 are secured upon the floor adjacent to the rear ends of the dump-logs, as shown in Fig. 3, so that when the vehicle wheels pass between said plates they will be in line with the channels 22 and 30. After the wheels of the vehicle start up the incline they are retained thereon by the side-flanges of the channels. After the load is discharged from the truck, the attendant again pulls the rod 44 to swing the cranks 41 forward and disengage them from the legs 25, whereupon the track-frame is pushed down to the horizontal position by the weight of the vehicle thereon, the movement being controlled by the buffer-cylinder and piston, and the cranks 41 dropping into the seats 46 to retain the frame in the lowered position after the truck has been driven on across the lowered frame.

It will be seen that the truck-dump mechanism and the wagon-dump may be operated alternately or in any sequence without interfering with each other, in each case the load of vehicle being discharged into the dump-hopper or chute and the vehicle then moved on along the driveway in which the dump is arranged, and in each case the weight or the forward movement of the vehicle furnishing the power necessary to restore the mechanism to normal position. It will also be seen that the truck-dump may be installed with but slight alteration of the wagon-dump, and requires no additional space above the floor of the driveway, and only sufficient space beneath the floor to accommodate the counterweight, buffer cylinder and frame-legs 25.

Now, having described our invention, what we claim and desire to secure by Letters Patent is:

1. In a mechanism of the class described, the combination with a driveway having a floor, of a track-frame pivotally connected at one end with the floor of said driveway and movable from a horizontal to an upwardly inclined position, means for moving the frame to the inclined position, means for locking the same in said position, means for controlling movement of the frame from the inclined to the horizontal position, means for locking the frame in the latter position, and means controlling said locking means.

2. Motor-truck dumping mechanism comprising a driveway having a floor, a tiltable frame pivoted at one end to said floor, releasable locking means for sustaining said frame in an inclined position at which it slopes upwardly from the floor, whereby a vehicle driven thereon will be inclined longitudinally, means controlling lowering of the frame to a horizontal position while the same is loaded, and means energized by lowering of the loaded frame for raising the same when not loaded to the inclined position.

3. Motor-truck dumping mechanism comprising fixed driveway floor-members, a track-frame pivotally connected at one end with said floor members and movable from a horizontal position in the plane of the floor to a position sloping upwardly from the pivoted end, means biasing the frame to the inclined position, the frame being movable to the horizontal position in opposition to the biasing means by the weight of a vehicle upon the frame, and releasable means for retaining the frame in each of said positions.

4. In a motor-truck dumping mechanism, a frame having parallel track-members, means pivoting said frame at one end to a fixed support, counterbalancing means connected with the frame and tending to swing the same about its pivotal axis to a position at which the track-members are inclined upwardly from said axis, and means for yieldably retarding movement of the frame from said inclined position to a horizontal position.

5. In a motor-truck dumping mechanism, a frame movable limitedly about a fixed pivotal axis at one end thereof and having track-members adapted to support the wheels of a truck, said track-members at one position of the frame being inclined to form ways upon which the front wheels of a motor-truck may be driven under power of the vehicle itself, to thereby sustain the vehicle in an inclined position suitable for discharging by gravitation a load therefrom at its rear end.

6. In a motor-truck dumping mechanism, a track-frame pivoted at one end upon a fixed axis and movable from a horizontal position to a position sloping upwardly from the pivotal axis, means tending to raise the frame to the inclined position, means for sustaining the frame in said position, means for retaining the frame in horizontal position, and means for yieldingly retarding movement of the frame from the inclined position to the horizontal position.

7. The combination with a wagon-dump mechanism having tiltable dump-logs and means for locking the same in normal horizontal position, of a motor-truck dump mechanism comprising a frame having track-members pivoted upon a transverse axis intermediate the ends of the dump-logs and alined with the dump-logs when in horizontal position, means for raising said frame to an inclined position, means for sustaining said frame in the inclined position, means controlling lowering of the frame to a horizontal position, and auxiliary track-members pivoted upon the dump-logs and tiltable with the dump-logs as a part thereof when the truck-dump frame is in horizontal position, said auxiliary track-members being inclinable with the truck-dump-frame as a part thereof when the dump-logs are in normal position.

8. The combination with a wagon-dump mechanism having tiltable dump-logs and means for retaining the same in a normal horizontal position, of a motor-truck dump mechanism comprising an inclinable frame having trackways alined with the dump-logs and provided with parts straddling the dump-logs whereby to enable tilting of the latter independently of said frame, said frame being pivoted at the ends of the straddling parts upon a fixed transverse axis intermediate the ends of the dump-logs, facing members hinged to the dump-logs and movable both therewith and with the inclinable frame, and means for controlling movement of the inclinable frame.

9. The combination with a wagon-dump mechanism having tiltable dump-logs, of a motor-truck dumping mechanism comprising a track-frame pivoted at one end upon a fixed transverse axis intermediate the ends of the dump-logs, said frame being movable about said axis from a horizontal position to an upwardly sloping position, means tending to raise the frame to the sloping position, means controlling lowering of the frame to the horizontal position, releasable means for retaining the frame in each of said positions, and track-members hinged to the dump-logs and engageable by the track-frame to be moved therewith to inclined position, said track-members also being movable with the dump-logs independently of the track-frame.

10. In a motor-truck dumping mechanism, a track-frame pivoted at one end upon a fixed axis and movable from a horizontal position to a position sloping upwardly from the pivotal axis, a counter-weight connected with the frame and tending to raise the same to the inclined position, means yieldingly retarding downward movement of the frame, locking means automatically engageable with the frame at both the raised and lowered positions thereof to retain the same in said positions, and means for releasing said locking means.

11. A combined wagon-dump and motor-truck dump, comprising a driveway having longitudinal laterally spaced openings therein, tiltable dump-logs disposed in said openings adjoining the rear end thereof, a frame having track-members lying normally in the forward portions of said openings and having parts straddling the forward portions of the dump-logs, said parts being pivoted at their rear ends on a fixed transverse axis, means for raising the frame to incline the track-members upwardly from the pivoted ends thereof, members pivoted on the dump-logs and engageable by said frame so as to be raised to inclined position therewith, and means for holding the frame in horizontal position, the dump-logs and members pivoted thereon being tiltable independently of the frame.

12. Combined wagon-dumping and motor-truck dumping mechanism, comprising pairs of laterally spaced and longitudinally alined and overlapping track-members pivoted on fixed transverse horizontal axes and movable thereabout from horizontal to inclined positions, separate releasable means for retaining each pair of said track-members normally in horizontal position, and auxiliary track-members hinged to one pair of the first-named track-members and movable bodily therewith from horizontal to inclined position, said auxiliary track-members being engageable by the other first-named pair of track-members and movable thereby and therewith to inclined positions while the track-members to which said auxiliary members are hinged remain in normal position.

13. Motor truck dumping means, comprising a horizontal platform upon and across which a vehicle may be driven, a pit-door arranged in said platform, and inclined track-members having one end at the level of the platform adjacent to the pit-door and sloping upwardly therefrom, whereby the front wheels of a motor vehicle may be elevated by driving the same onto said track-members while the rear wheels of the vehicle rest upon the platform adjoining the lower end of said track members, and the body of the vehicle thus caused to assume an inclined position adapted for discharging a load by gravity from the rear end of said body through the pit-door.

C. B. MOFFITT.
ERNEST DAU.